United States Patent
Matsuno

(10) Patent No.: US 11,111,144 B2
(45) Date of Patent: Sep. 7, 2021

(54) OZONE GAS GENERATOR AND METHOD FOR MANUFACTURING OZONE GAS GENERATOR

(71) Applicant: Sumitomo Precision Products Co., Ltd., Amagasaki (JP)

(72) Inventor: Takashi Matsuno, Amagasaki (JP)

(73) Assignee: Sumitomo Precision Products Co., Ltd., Amagasaki (JP)

( * ) Notice: Subject to any disclaimer, the term of this patent is extended or adjusted under 35 U.S.C. 154(b) by 183 days.

(21) Appl. No.: 16/084,812

(22) PCT Filed: Mar. 21, 2017

(86) PCT No.: PCT/JP2017/011243
§ 371 (c)(1),
(2) Date: Sep. 13, 2018

(87) PCT Pub. No.: WO2017/164178
PCT Pub. Date: Sep. 28, 2017

(65) Prior Publication Data
US 2019/0071309 A1 Mar. 7, 2019

(30) Foreign Application Priority Data

Mar. 25, 2016 (JP) .............................. JP2016-061387

(51) Int. Cl.
*C01B 13/11* (2006.01)

(52) U.S. Cl.
CPC .......... *C01B 13/11* (2013.01); *C01B 2201/22* (2013.01); *C01B 2201/30* (2013.01); *C01B 2201/32* (2013.01); *C01B 2201/90* (2013.01)

(58) Field of Classification Search
CPC . C01B 13/11; C01B 2201/22; C01B 2201/30; C01B 2201/32; C01B 2201/14;
(Continued)

(56) References Cited

U.S. PATENT DOCUMENTS

2008/0193343 A1*   8/2008   Vezzu ................... C01B 13/11
                                                        422/186.18
2012/0189504 A1    7/2012   Matsuno et al.

FOREIGN PATENT DOCUMENTS

JP   2001-294406 A   10/2001
JP    2005-53766 A    3/2005
(Continued)

OTHER PUBLICATIONS

International Search Report (PCT/ISA/210) issued in PCT Application No. PCT/JP2017/011243 dated Jun. 20, 2017 with English translation (five (5) pages).
(Continued)

*Primary Examiner* — Xiuyu Tai
(74) *Attorney, Agent, or Firm* — Crowell & Moring LLP

(57) ABSTRACT

An ozone gas generator includes a first electrode portion that includes a first electrode, and a second electrode portion that faces the first electrode portion, is disposed with a predetermined interval at which discharge between the first electrode portion and the second electrode portion is possible, and includes a second electrode, in which at least one of the first electrode portion and the second electrode portion includes a dielectric that is provided on a surface of the first electrode or the second electrode on sides facing each other, and at least one of the first electrode portion and the second electrode portion includes a layer that is provided on at least a portion of the surface of the first electrode or the second electrode on the sides facing each other, or the dielectric, and includes at least one of a metal or a metal compound, and the first electrode portion and the second electrode portion are configured such that accuracy of an interval between surfaces facing each other is ±3% or more and ±50% or less.

10 Claims, 3 Drawing Sheets

(58) Field of Classification Search
CPC ............ C01B 2201/90; C01B 2201/12; C01B 2201/64; C01B 2201/34; C01B 2201/10; C01B 2201/76; H01J 37/32; H01J 37/3255; D21C 9/153; C02F 1/78; C02F 2303/04; C02F 2201/782; H01T 19/00; H01T 23/00; C23C 4/11

See application file for complete search history.

(56) References Cited

FOREIGN PATENT DOCUMENTS

| | | |
|---|---|---|
| JP | 2009-209013 A | 9/2009 |
| JP | 2012-126614 A | 7/2012 |
| WO | WO 2011/039971 A1 | 4/2011 |

OTHER PUBLICATIONS

Japanese-language Written Opinion (PCT/ISA/237) issued in PCT Application No. PCT/JP2017/011243 dated Jun. 20, 2017 (four (4) pages).

* cited by examiner

RELATIONSHIP BETWEEN GAP ACCURACY AND OZONE CONCENTRATION (EXAMPLE 1)

RELATIONSHIP BETWEEN NUMBER OF DISCHARGE CELLS AND OZONE CONCENTRATION (EXAMPLE 2)

OZONE GAS GENERATOR AND METHOD FOR MANUFACTURING OZONE GAS GENERATOR

TECHNICAL FIELD

The present invention relates to an ozone gas generator and a method for manufacturing an ozone gas generator.

BACKGROUND ART

In the related art, an ozone gas generator is known. Such an ozone gas generator is disclosed in JP-A-2012-126614, for example.

JP-A-2012-126614 discloses an ozone generator (ozone gas generator) that includes a ground electrode pipe and a high voltage electrode pipe which are disposed with a discharge gap therebetween. In the ozone generator, the ground electrode pipe and the high voltage electrode pipe are assembled such that the discharge gap becomes uniform, in order to stably generate ozone gas.

PRIOR ART

Patent Document

[PTL 1] JP-A-2012-126614

SUMMARY OF THE INVENTION

Problem to be Solved by the Invention

However, in the ozone generator of JP-A-2012-126614, the ground electrode pipe and the high voltage electrode pipe are assembled such that the discharge gap becomes uniform with high accuracy, in order to stably generate the ozone gas. Therefore, since there is a need to accurately assemble the ground electrode pipe and the high voltage electrode pipe, there is a problem that it is difficult to manufacture the ozone generator. In particular, in a case where the discharge gap is small, an absolute value of an allowable error becomes very small, and thus it is more difficult to make the discharge gap accurately uniform. Therefore, in a case where the discharge gap is small, there is a problem that it is more difficult to manufacture the ozone generator.

The present invention is made in order to solve the problems described above, and an object of the present invention is to provide an ozone gas generator that is capable of stably generating ozone gas, and is capable of being easily manufactured, and a method for manufacturing such an ozone gas generator.

Means for Solving the Problem

As a result of intensive study by the inventors of the present application in order to solve the problems, it is found out that an ozone gas generator includes a first electrode portion that includes a first electrode, and a second electrode portion that is disposed to face the first electrode portion, and includes a second electrode, in which at least a portion of a surface of the first electrode portion or the second electrode portion on sides facing each other is formed of a layer including at least one of a metal or a metal compound, and the first electrode portion and the second electrode portion are configured such that accuracy of an interval (referred to as a discharge gap, hereinafter) between surfaces facing each other is ±10% or more and ±50% or less, thereby, the ozone gas generator is capable of stably generating ozone gas. That is, the inventors of the present application obtain the founding that it is possible to stably generate the ozone gas, as long as the accuracy of the discharge gap which is considered that there is a need for high accuracy in the related art is ±50% or less, in a case where the layer including at least one of the metal or the metal compound is provided. The metal compound is a compound including a metal element. For example, there are a metal oxide, a metal nitride, and the like.

According to a first aspect of the present invention, there is provided an ozone gas generator including a first electrode portion that includes a first electrode, and a second electrode portion that faces the first electrode portion, is disposed with a predetermined interval at which discharge between the first electrode portion and the second electrode portion is possible, and includes a second electrode, in which at least one of the first electrode portion and the second electrode portion includes a dielectric that is provided on a surface of the first electrode or the second electrode on sides facing each other, and at least one of the first electrode portion and the second electrode portion includes a layer that is provided on at least a portion of the surface of the first electrode or the second electrode on the sides facing each other, or the dielectric, and includes at least one of a metal or a metal compound, and the first electrode portion and the second electrode portion are configured such that accuracy of an interval between surfaces facing each other is ±10% or more and ±50% or less.

In the ozone gas generator according to the first aspect of the present invention, as described above, the layer including at least one of the metal or the metal compound is provided, and the accuracy of the discharge gap is configured to be ±10% or more and ±50% or less, thereby, it is possible to stably generate the ozone gas, and it is possible to easily manufacture the ozone gas generator. In other words, since the accuracy of assembling the first electrode portion and the second electrode portion need not be tightly pursued, by making the accuracy (error) of the discharge gap ±10% or more (looser than ±10%), it is possible to easily manufacture the ozone gas generator. The layer including at least one of the metal or the metal compound is provided, and the accuracy (error) of the discharge gap is made ±50% or less (tighter than ±50%), thereby, it is possible to stably generate the ozone gas. As the reason for this, it is considered that an influence of improvement in ozone gas generation efficiency by the layer including at least one of the metal or the metal compound is larger than an influence by making the accuracy of the discharge gap loose, with respect to the ozone gas generation efficiency. That is, the metal or the metal compound is more preferably a material which is capable of more efficiently generating the ozone gas. Effects described above are particularly effective in a case where the discharge gap is small. In other words, in a case where the discharge gap is small, since an absolute value of an allowable error becomes very small if the accuracy thereof is tightly pursued, it is very difficult to manufacture the ozone gas generator. On the other hand, in the invention of the present application, since there is no need to tightly pursue the accuracy of the discharge gap, it is possible to easily manufacture even the ozone gas generator of which the discharge gap is small.

In the ozone gas generator according to the first aspect, preferably, the first electrode portion and the second electrode portion are configured such that the accuracy of the interval between the surfaces facing each other in 30% or more of a discharging effective area is ±10% or more and ±50% or less. Here, the ozone gas generator of the present application generates the ozone gas by supplying a raw material gas to the interval between the first electrode portion and the second electrode portion, and generating the discharge in the interval. The discharging effective area is an area of the surfaces facing each other in the first electrode and the second electrode among an area of the surfaces facing each other in the first electrode portion and the second electrode portion. In this manner, the accuracy of the intervals facing each other in 30% or more of the discharging effective area of the first electrode portion and the second electrode portion is managed, thereby, it is possible to prevent the generation efficiency of the ozone gas from being lowered. In a case where the accuracy of the intervals facing each other in less than 30% of the discharging effective area of the first electrode portion and the second electrode portion is managed, there is a case where it is not possible to sufficiently prevent the generation efficiency of the ozone gas from being lowered. In a case where the accuracy of the intervals facing each other in less than 100% of the discharging effective area of the first electrode portion and the second electrode portion is managed, it is possible to prevent work from being complicated, and the assembling work time from being prolonged at the time of manufacturing the ozone gas generator, in comparison with a case where the accuracy of the intervals facing each other in 100% (all the effective area) of the effective area is managed.

In the ozone gas generator according to the first aspect, preferably, a plurality of discharge cells, each of which is formed of the first electrode portion and the second electrode portion are provided, and the first electrode portion and the second electrode portion of each of the plurality of discharge cells are configured such that the accuracy of the interval between the surfaces facing each other is ±10% or more and ±50% or less. Here, if the accuracy of the discharge gap is tightly pursued, it is difficult to manufacture one discharge cell in itself. In the ozone gas generator in which the plurality of discharge cells are provided, particularly, in the ozone gas generator in which the plurality of discharge cells are provided to be integrated in a predetermined volume, since there is a need to assemble the plurality of discharge cells by further integrate the plurality of discharge cells after manufacturing the plurality of discharge cells of which the manufacturing is difficult in itself, it is very difficult to manufacture the ozone gas generator. This is particularly noticeable in the ozone gas generator of which the discharge gap is small. On the other hand, in the invention of the present application, there is no need to tightly pursue the accuracy, by managing the accuracy of each discharge gap of the plurality of discharge cells to be ±10% or more and ±50% or less. Thereby, it is possible to easily manufacture the ozone gas generator including the plurality of discharge cells.

In this case, preferably, the first electrode portion and the second electrode portion of each of the plurality of discharge cells are configured such that the accuracy of the interval between the surfaces facing each other is ±10% or more and ±50% or less, with respect to a predetermined reference interval. According to the configuration described above, since it is possible to manage the discharge gaps of the plurality of discharge cells to be ±10% or more and ±50% or less, respectively, with respect to a common reference interval, it is possible to prevent a variation in the discharge gap between the plurality of discharge cells. Thereby, since it is possible to prevent the variation in the generation efficiency of the ozone gas which is generated between the plurality of discharge cells, it is possible to stably generate the ozone gas as a whole of the ozone gas generator including the plurality of discharge cells.

In the ozone gas generator according to the first aspect, preferably, the first electrode portion and the second electrode portion are configured such that the accuracy of the interval to an average of the intervals between the surfaces facing each other in the discharging effective area is ±10% or more and ±50% or less. According to the configuration described above, since it is possible to prevent the variation from the average of the discharge gap, it is possible to stably generate the ozone gas.

In the ozone gas generator according to the first aspect, preferably, the first electrode portion and the second electrode portion are configured such that the accuracy of the interval between the surfaces facing each other is ±10% or more and ±50% or less, with respect to a predetermined reference interval of 300 µm or less. Here, it is very difficult to accurately manufacture the ozone gas generator of which the reference interval is 300 µm or less, and the discharge gap is small. On the other hand, in the invention of the present application, since there is no need to tightly pursue the accuracy, it is possible to easily manufacture the ozone gas generator of which the reference interval is 300 µm or less, and the discharge gap is small.

In the ozone gas generator according to the first aspect, preferably, the first electrode portion and the second electrode portion are configured such that the accuracy of the interval between the surfaces facing each other is ±10% or more and ±30% or less. In this manner, the accuracy of the discharge gap is made ±30% or less, thereby, it is possible to stably generate the ozone gas.

In the ozone gas generator according to the first aspect, preferably, the layer that includes at least one of the metal or the metal compound is a layer including a metal compound, and the metal compound includes at least one metal of titanium, niobium, and tungsten. Here, it is known that it is possible to stably generate the ozone gas of a high concentration, by adding nitrogen gas of a very small amount or the like to high purity oxygen gas as a raw material gas. However, in a case where the nitrogen gas is included in the raw material gas, since a nitrogen oxide is generated as a by-product, it is not suitable for the ozone gas generator which is used in a semiconductor field or the like. On the other hand, in a case where the high purity oxygen gas which is nitrogenless (to which the nitrogen is not added) is used as a raw material gas, the layer including the metal compound is provided in at least a portion of the surface of the first electrode or the second electrode on the sides facing each other, or the dielectric, thereby, it is possible to stably generate the high concentration ozone gas. In particular, the metal compound includes at least one element of titanium, niobium, and tungsten, thereby, it is possible to more stably generate the high concentration ozone gas.

According to a second aspect of the present invention, there is provided a method for manufacturing an ozone gas generator, including a step of forming a first electrode portion that includes a first electrode, a step of forming a second electrode portion that includes a second electrode, and a step of disposing the first electrode portion and the second electrode portion with a predetermined interval at which discharge is possible by causing the first electrode portion and the second electrode portion to face each other, in which the step of forming at least one of the first electrode portion and the second electrode portion includes a step of providing a dielectric on a surface of the first electrode or the second electrode on sides facing each other in the first electrode portion and the second electrode portion, the step of forming at least one of the first electrode portion and the second electrode portion includes a step of providing a layer that includes at least one of a metal or a metal compound on at least a portion of the surface of the first electrode or the second electrode on the sides facing each other, or the dielectric in the first electrode portion and the second electrode portion, and the step of disposing the first electrode portion and the second electrode portion with a predetermined interval at which discharge is possible by causing the first electrode portion and the second electrode portion to face each other includes a step of disposing the first electrode portion and the second electrode portion with a predetermined interval such that accuracy of an interval between surfaces facing each other in the first electrode portion and the second electrode portion is ±10% or more and ±50% or less.

In the method for manufacturing an ozone gas generator according to the second aspect of the present invention, by making the configured described above, it is possible to stably generate the ozone gas, and it is possible to easily manufacture the ozone gas generator. In other words, since the accuracy of assembling the first electrode portion and the second electrode portion need not be tightly pursued, by making the accuracy (error) of the discharge gap ±10% or more (looser than ±10%), it is possible to easily manufacture the ozone gas generator. The layer including at least one of the metal or the metal compound is provided, and the accuracy (error) of the discharge gap is made ±50% or less (tighter than ±50%), thereby, it is possible to manufacture the ozone gas generator that is capable of stably generating the ozone gas. As the reason for this, it is considered that the influence of the improvement in ozone gas generation efficiency by the layer including at least one of the metal or the metal compound is larger than the influence by making the accuracy of the discharge gap loose, with respect to the ozone gas generation efficiency. That is, the metal or the metal compound is more preferably a material which is capable of more efficiently generating the ozone gas. The effects described above are particularly effective in a case where the discharge gap is small. In other words, in a case where the discharge gap is small, since the absolute value of the allowable error becomes very small if the accuracy thereof is tightly pursued, it is very difficult to manufacture the ozone gas generator. On the other hand, in the invention of the present application, since there is no need to tightly pursue the accuracy of the discharge gap, it is possible to easily manufacture even the ozone gas generator of which the discharge gap is small.

Effect of the Invention

According to the present invention, as described above, it is possible to stably generate the ozone gas, and it is possible to easily manufacture the ozone gas generator.

MODES FOR CARRYING OUT THE INVENTION

Hereinafter, embodiments of the present invention will be described based on the drawings.

(Configuration of Ozone Gas Generator)

Figure 1:
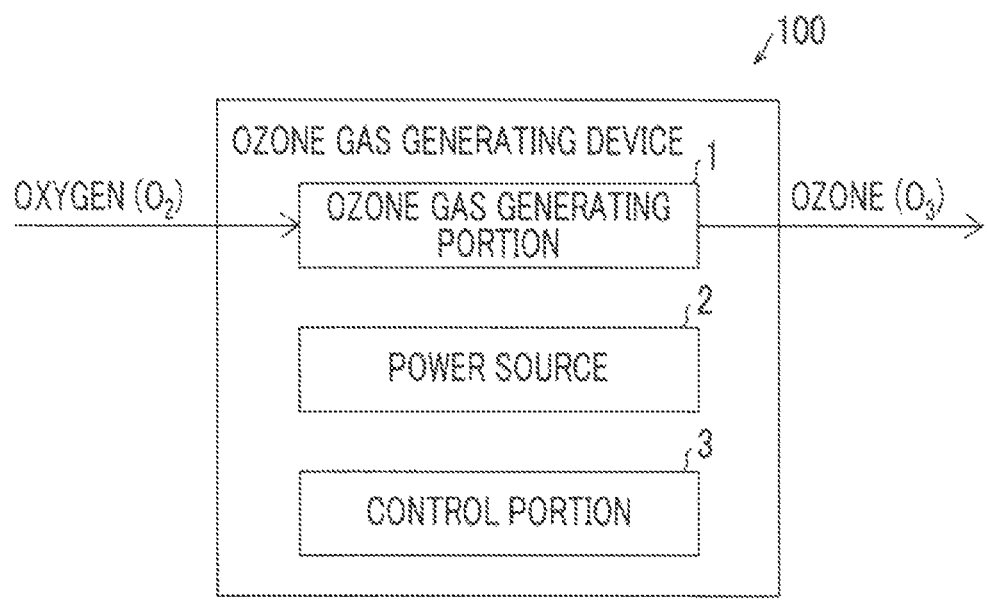
FIG. 1 is a block diagram illustrating an ozone gas generator according to one embodiment of the present invention.

A configuration of an ozone gas generator 100 according to one embedment of the present invention will be described, with reference to FIG. 1.

The ozone gas generator 100 according to one embodiment of the present invention is configured to generate ozone gas, using oxygen gas ($O_2$) as a raw material. For example, the ozone gas generator 100 is configured to prevent a concentration of impurities (substances other than ozone and oxygen) in the generated ozone gas, using the oxygen gas of high purity (for example, an oxygen concentration of 99.99% or more). As illustrated in FIG. 1, the ozone gas generator 100 includes an ozone gas generating portion 1, a power source 2, and a control portion 3.

For example, the ozone gas generating portion 1 is configured to generate the high concentration ozone gas by supplying the high purity oxygen gas ($O_2$) as a raw material. In this case, other gases such as nitrogen are not added to the high purity oxygen gas as a raw material. In other words, the ozone gas generator 100 is capable of generating the high concentration ozone gas, using the high purity oxygen gas to which the nitrogen is not added as a raw material. In the ozone gas generator 100, as a raw material, air may be supplied, or gas obtained by adding other gases such as nitrogen to oxygen may be supplied.

Figure 2:
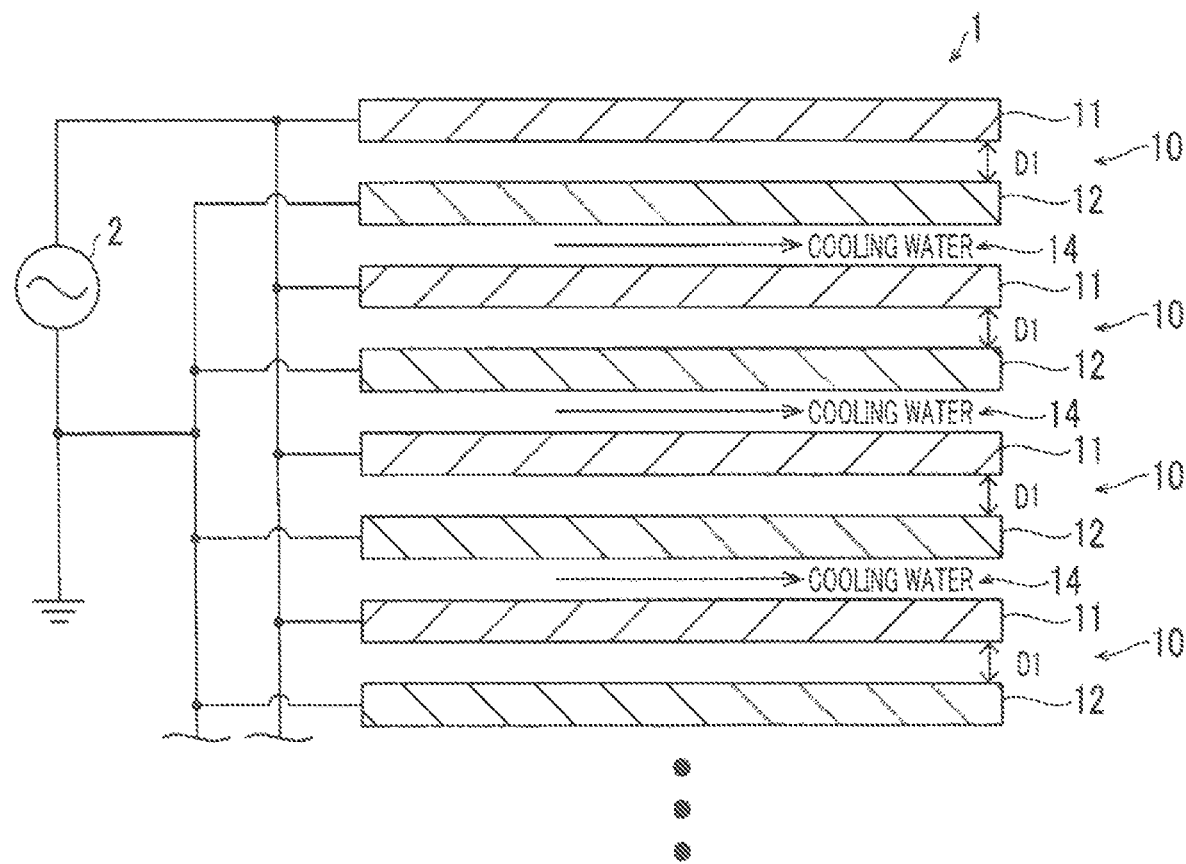
FIG. 2 is a schematic diagram illustrating an ozone gas generating portion of the ozone gas generator according to one embodiment of the present invention.
Figure 3:
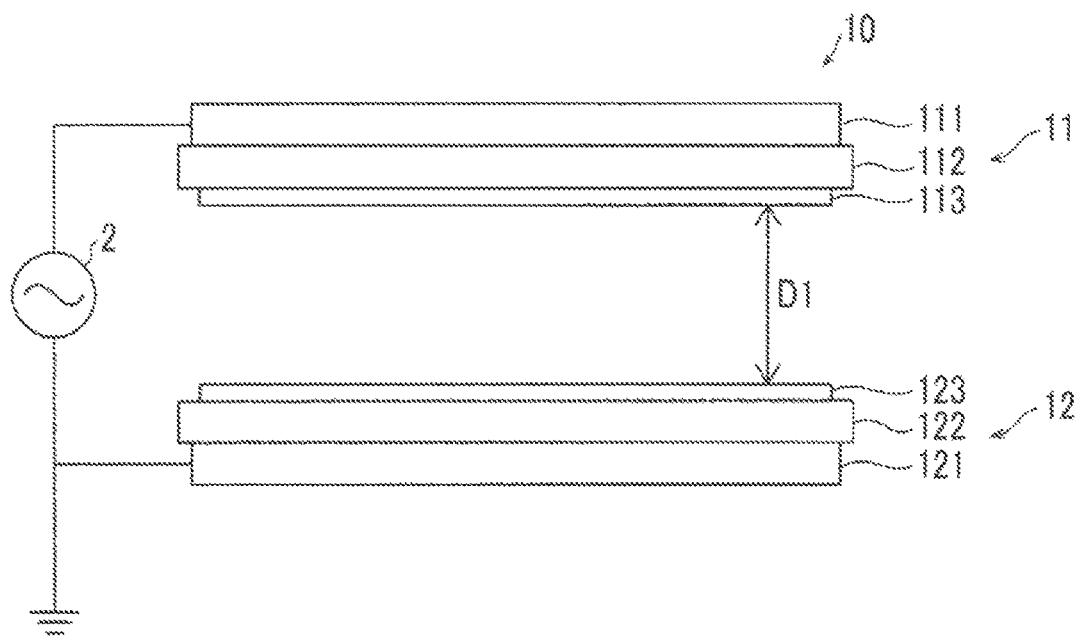
FIG. 3 is a schematic diagram illustrating a discharge cell of the ozone gas generator according to one embodiment of the present invention.

As illustrated in FIG. 2, the ozone gas generating portion 1 includes a plurality of discharge cells 10. As illustrated in FIG. 3, the discharge cell 10 includes a first electrode portion 11, and a second electrode portion 12. The first electrode portion 11 has a first electrode 111, a dielectric 112, and a functional film 113. The second electrode portion 12 has a second electrode 121, a dielectric 122, and a functional film 123. The plurality of discharge cells 10 have the same configurations. The discharge cell 10 is configured to perform silent discharge due to the applying by the power source 2. Between each of the plurality of discharge cells 10, a flow path 14 through which cooling water for cooling the discharge cell 10 passes is provided. The flow path 14 may cool the discharge cell 10, through cooling gas. The functional films 113 and 123 are an example of a "layer including at least one of a metal or a metal compound" in the scope of the claims.

As illustrated in FIG. 3, the first electrode portion 11 and the second electrode portion 12 are disposed to face each other. The first electrode portion 11 and the second electrode portion 12 are disposed with a predetermined interval at which discharge is possible. Surfaces facing each other in the first electrode portion 11 and the second electrode portion 12 are formed into a substantially flat shape.

The first electrode 111 and the second electrode 121 are respectively disposed on an outside of a pair of dielectrics 112 and 122, and are configured to generate dielectric barrier discharge (silent discharge) between the pair of dielectrics 112 and 122. In other words, the power source 2 is connected to the first electrode 111 and the second electrode 121. Alternating current power of high frequency voltage is supplied to the first electrode 111 and the second electrode 121 from the power source 2. The first electrode 111 and the second electrode 121 are respectively formed into a film shape. The first electrode 111 and the second electrode 121 are disposed to face each other.

The pair of dielectrics 112 and 122 are disposed at a predetermined interval to face each other. The pair of dielectrics 112 and 122 are respectively formed of alumina (ceramic). The pair of dielectrics 112 and 122 are respectively formed into a plate shape. The pair of dielectrics 112 and 122 respectively have areas which are larger than those of the first electrode 111 and the second electrode 121, and are disposed to respectively cover the surface (surface on sides facing each other) on an inside of the first electrode 111 and the second electrode 121. For example, the dielectrics 112 and 122 have plate thicknesses of approximately 0.05 mm or more and approximately 1 mm or less. In order to obtain stable performance, preferably, the dielectrics 112 and 122 have the plate thicknesses of approximately 0.1 mm or more and approximately 0.3 mm or less.

A pair of functional films 113 and 123 are respectively provided on the surfaces facing each other of the pair of dielectrics 112 and 122. In other words, the functional films 113 and 123 are disposed to be in contact with an interval (a discharging space) between the pair of dielectrics 112 and 122. The functional films 113 and 123 are respectively provided on at least a portion of the surfaces of the dielectrics 112 and 122. The oxygen gas of the raw material is configured to be supplied to the interval between the pair of functional films 113 and 123. The functional films 113 and 123 include at least one of the metal or the metal compound. For example, the functional films 113 and 123 include a metal oxide or a metal nitride. Preferably, the functional films 113 and 123 include the metal compound, and the metal compound includes at least one element of titanium, niobium, and tungsten. More preferably, the functional films 113 and 123 include at least one metal oxide of titanium, niobium, and tungsten.

For example, the functional films 113 and 123 may include a first metal oxide of one metal or two or more metals selected from niobium, tantalum, molybdenum, and chromium, and a second metal oxide of one metal or two or more metals selected from titanium, tungsten, zinc, and iron.

For example, the functional films 113 and 123 may include an alkali metal, an alkaline earth metal, or a transition metal bronze into which a rare earth element is put, at a position A of a transition metal oxide having a crystal structure in which an atom is not present at a position A of a perovskite structure. In this case, for example, as a transition metal oxide, $V_2O_5$, $Sb_2O_3$, $WO_3$, $Mn_3O_4$, $Fe_2O_3$, NiO, or $Co_3O_4$ may be used.

For example, the functional films 113 and 123 may include a functional substance for inhibiting an ozone concentration from being lowered. For example, as a functional substance, Ti, W, Sb, Mn, Fe, Co, Ni, V, or Zn, alternatively, an oxide ($M_xO_y$) of the metals may be used.

For example, the functional films 113 and 123 may include a low resistance coating layer which is formed of a powdered metal or an oxide thereof, and an inorganic system fixing material. In this case, for example, as a powdered metal or an oxide thereof, one selected from Ti, W, Sb, Mn, Fe, Co, Ni, V, and Zn, and an oxide of the elements may be used alone, or two or more selected therefrom may be used by being mixed.

For example, the functional films 113 and 123 may include a solid acid catalyst. In this case, for example, as a solid acid catalyst, a metal oxide of one metal or two or more metals selected from niobium, tantalum, and molybdenum may be used.

For example, the functional films 113 and 123 may include a chromium oxide.

Figure 4:
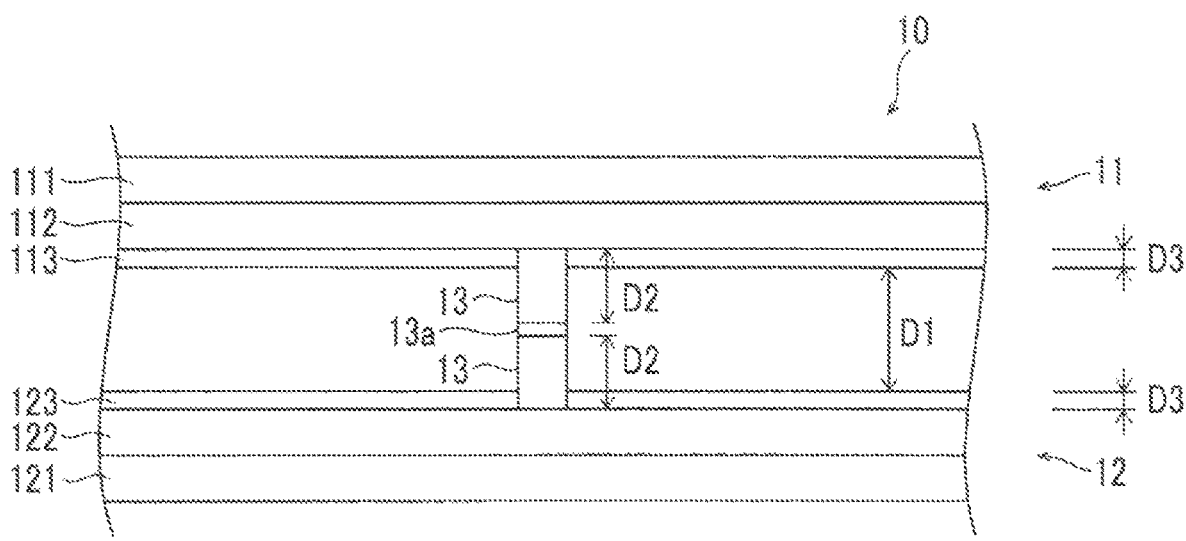
FIG. 4 is a diagram for describing an interval between a first electrode portion and a second electrode portion of the discharge cell of the ozone gas generator according to one embodiment of the present invention.

As illustrated in FIG. 4, a rib 13 is provided between the first electrode portion 11 and the second electrode portion 12. Thereby, an interval (discharge gap) D1 between the surfaces facing each other in the first electrode portion 11 and the second electrode portion 12 is maintained. The ribs 13 are provided in both of the first electrode portion 11 and the second electrode portion 12. The ribs 13 which are provided in both of the first electrode portion 11 and the second electrode portion 12 are bonded (joined) to each other by an adhesive layer 13a. For example, the adhesive layer 13a includes glass.

The power source 2 is configured to supply the alternating current power to the first electrode 111 and the second electrode 121 of the ozone gas generating portion 1. The power source 2 is configured to supply the high frequency power which resonates by an LC circuit or the like. As illustrated in FIG. 2, the plurality of discharge cells 10 are connected to the power source 2 in parallel. In other words, the plurality of discharge cells 10 are configured such that the power is supplied from the common power source 2.

The control portion 3 is configured to control each portion of the ozone gas generator 100. For example, the control portion 3 controls the power source 2 to control the power which is supplied to the ozone gas generating portion 1.

Here, in the present embodiment, the first electrode portion 11 and the second electrode portion 12 are configured such that accuracy of the discharge gap D1 is ±3% or more and ±50% or less. In other words, the accuracy of the interval (discharge gap D1) between the surface of the functional film 113 of the first electrode portion 11 and the surface of the functional film 123 of the second electrode portion 12 is configured to be ±3% or more and ±50% or less. The discharge gap D1 has a size of a scope of $(1-x/100) \times Da \leq D1 \leq (1+x/100) \times Da$, in a case where a reference interval is referred to as Da, and the accuracy is ±x %. For example, in a case where the accuracy is ±3%, the discharge gap D1 has the size of the scope of $(1-0.03) \times Da \leq D1 \leq (1+0.03) \times Da$. In a case where the accuracy is ±50%, the discharge gap D1 has the size of the scope of $(1-0.5) \times Da \leq D1 \leq (1+0.5) \times Da$.

Preferably, the first electrode portion 11 and the second electrode portion 12 are configured such that the accuracy of the discharge gap D1 is ±10% or more and ±50% or less. More preferably, the first electrode portion 11 and the second electrode portion 12 are configured such that the accuracy of the discharge gap D1 is ±20% or more and ±50% or less.

Moreover, preferably, the first electrode portion 11 and the second electrode portion 12 are configured such that the accuracy of the discharge gap D1 is ±3% or more and ±40% or less. More preferably, the first electrode portion 11 and the second electrode portion 12 are configured such that the accuracy of the discharge gap D1 is ±3% or more and ±30% or less. Further preferably, the first electrode portion 11 and the second electrode portion 12 are configured such that the accuracy of the discharge gap D1 is ±10% or more and ±30% or less. More further preferably, the first electrode portion 11 and the second electrode portion 12 are configured such that the accuracy of the discharge gap D1 is ±20% or more and ±30% or less.

In the present embodiment, the first electrode portion 11 and the second electrode portion 12 are configured such that the accuracy of the discharge gap D1 in 30% or more of a discharging effective area is ±3% or more and ±50% or less. Preferably, the first electrode portion 11 and the second electrode portion 12 are configured such that the accuracy of the discharge gap D1 in 50% or more of the discharging effective area is ±3% or more and ±50% or less. More preferably, the first electrode portion 11 and the second electrode portion 12 are configured such that the accuracy of the discharge gap D1 in 70% or more of the discharging effective area is ±3% or more and ±50% or less. Further preferably, the first electrode portion 11 and the second electrode portion 12 are configured such that the accuracy of the discharge gap D1 in 90% or more of the discharging effective area is ±3% or more and ±50% or less. It is needless to say that the accuracy of the discharge gap D1 in 100% of the discharging effective area may be configured to be ±3% or more and ±50% or less.

In the present embodiment, the first electrode portion 11 and the second electrode portion 12 of each of the plurality of discharge cells 10 are configured such that the accuracy of the discharge gap D1 is ±3% or more and ±50% or less. That is, in the plurality of discharge cells 10, the accuracy of a variation in the discharge cell 10 of the discharge gap D1 of each discharge cell 10 is configured to be ±3% or more and ±50% or less. The first electrode portion 11 and the second electrode portion 12 of each of the plurality of discharge cells 10 are configured such that the accuracy of the discharge gap D1 is ±3% or more and ±50% or less, with respect to the predetermined reference interval Da. In other words, the accuracy of the variation in the discharge gap D1 between the plurality of discharge cells 10 is configured to be ±3% or more and ±50% or less.

The first electrode portion 11 and the second electrode portion 12 are configured such that the accuracy of the interval to an average of the discharge gaps D1 in the discharging effective area is ±3% or more and ±50% or less.

In order to generate the ozone gas of the high concentration, the first electrode portion 11 and the second electrode portion 12 are configured such that the reference interval Da of the discharge gap D1 is 300 μm or less. Preferably, in order to generate the ozone gas of the higher concentration, the first electrode portion 11 and the second electrode portion 12 are configured such that the reference interval Da of the discharge gap D1 is 200 μm or less. More preferably, in order to generate the ozone gas of the further higher concentration, the first electrode portion 11 and the second electrode portion 12 are configured such that the reference interval Da of the discharge gap D1 is 100 μm or less.

As illustrated in FIG. 4, the discharge gap D1 is affected by a height D2 of the rib 13, and film thicknesses D3 of the functional films 113 and 123. A thickness of the adhesive layer 13a is negligibly small. Specifically, it is made that D1≈D2×2−D3×2. However, D1 varies in the discharge cell 10 due to a variation amount (amount of being not uniform) in the discharge cell 10 of the height D2 of the rib 13. Moreover, D1 varies in the discharge cell 10 due to the variation amount (amount of being not uniform) in the discharge cell 10 of the film thickness D3.

(Method for Manufacturing Ozone Gas Generator)

A method for manufacturing the ozone gas generator 100 (ozone gas generating portion 1) will be described.

The rib 13 is formed on the dielectric 112 (122) as a base material. Specifically, the material of the rib 13 is applied or printed on the surface of the dielectric 112 (122). Thereafter, the material thereof is baked. Therefore, in order to uniformize the height of the rib 13, the surface of the rib 13 is polished by lap polishing. Thereby, the rib 13 is formed on the dielectric 112 (122).

Therefore, the functional film 113 (123) is formed on the surface of the dielectric 112 (122) on the side where the rib 13 is formed. Specifically, the material of the functional film 113 (123) is printed by screen printing, at a spot where the rib 13 is not formed on the surface of the dielectric 112 (122). Thereafter, the material thereof is baked, thereby, the functional film 113 (123) is formed on the surface of the dielectric 112 (122).

At the time of forming the rib 13, the height of the rib 13 from the surface of the functional film 113 (123) is measured, by an equipment such as a height gauge or a micro gauge that measures a length. The height of the rib 13 from the surface of the functional film 113 (123) may be measured, by an equipment such as a laser displacement meter which uses a laser. The rib 13 is polished such that the height (D2−D3) of the rib 13 from the surface of the functional film 113 (123) is approximately ½ of the reference interval Da. Here, since the discharge gap D1 is affected by D2 and D3, the accuracy of the film thickness D3 of the functional film 113 (123) and the height D2 of the rib 13 is managed, thereby, the accuracy of the discharge gap D1 is managed to be ±3% to ±50%.

Therefore, the first electrode 111 (second electrode 121) is formed on the surface of the side which is opposite to the functional film 113 (123) of the dielectric 112 (122). Specifically, the metal such as silver or copper as an electrode is formed on the surface of the dielectric 112 (122). A step of forming the first electrode 111 (second electrode 121) may be performed before a step of forming the functional film 113 (123).

Next, the first electrode portion 11 in which the functional film 113 and the rib 13 are formed, and the second electrode portion 12 in which the functional film 123 and the rib 13 are formed, are bonded (joined) in a state of causing the functional films 113 and 123 to face each other. At this time, as described above, since the accuracy of the film thickness D3 of the functional film 113 (123) and the height D2 of the rib 13 is managed, the accuracy of the discharge gap D1 becomes ±3% or more and ±50% or less. The surfaces of the first electrode 111 and the second electrode 121 of the adjacent dielectrics 112 and 122 forming the discharge cells 10 which are adjacent to each other are bonded (joined) by the adhesive layer through an insulator (not illustrated in the drawing). Thereby, the plurality of discharge cells 10 are assembled. The flow paths 14 (see FIG. 2) through which the cooling water passes are respectively provided between the plurality of discharge cells 10, and the ozone gas generating portion 1 is assembled.

(Effect of Embodiment)

In the present embodiment, it is possible to obtain the following effects.

In the present embodiment, as described above, the functional films 113 and 123 are respectively provided in at least a portion of the dielectric 112 of the first electrode portion 11 and the dielectric 122 of the second electrode portion 12 on the sides facing each other, and the accuracy of the discharge gap D1 is configured to be ±3% or more and ±50% or less, thereby, it is possible to stably generate the ozone gas, and it is possible to easily manufacture the ozone gas generator 100. In other words, since the accuracy of assembling the first electrode portion 11 and the second electrode portion 12 need not be tightly pursued, by making the accuracy (error) of the discharge gap D1 ±3% or more (looser than ±3%), it is possible to easily manufacture the ozone gas generator 100. The functional films 113 and 123 are respectively provided in at least a portion of the dielectric 112 of the first electrode portion 11 and the dielectric 122 of the second electrode portion 12 on the sides facing each other, and the accuracy of the discharge gap D1 is made ±50% or less (tighter than ±50%), thereby, it is possible to stably generate the ozone gas. The effects described above are particularly effective in a case where the discharge gap D1 is small. In other words, in a case where the discharge gap D1 is small, since an absolute value of an allowable error becomes very small if the accuracy thereof is tightly pursued, it is very difficult to manufacture the ozone gas generator. On the other hand, in the present embodiment, since there is no need to tightly pursue the accuracy of the discharge gap D1, it is possible to easily manufacture even the ozone gas generator 100 of which the discharge gap D1 is small.

In the present embodiment, as described above, since the first electrode portion 11 and the second electrode portion 12 are configured such that the accuracy of the discharge gap D1 is ±3% or more and ±50% or less in 30% or more of the discharging effective area, it is possible to prevent generation efficiency of the ozone gas from being lowered. Therefore, it is possible to prevent work from being complicated, and the assembling work time from being prolonged at the time of manufacturing the ozone gas generator, in comparison with a case where the accuracy of the discharge gap D1 in 100% (all the effective area) of the effective area is managed. In a case where the first electrode portion 11 and the second electrode portion 12 are configured such that the accuracy of the discharge gap D1 in 50% or more of the discharging effective area is ±3% or more and ±50% or less, it is possible to effectively prevent the generation efficiency of the ozone gas from being lowered, while it is possible to prevent the work from being complicated, and the assembling work time from being prolonged at the time of manufacturing the ozone gas generator. In a case where the first electrode portion 11 and the second electrode portion 12 are configured such that the accuracy of the discharge gap D1 in 70% or more of the discharging effective area is ±3% or more and ±50% or less, it is possible to more effectively prevent the generation efficiency of the ozone gas from being lowered, while it is possible to prevent the work from being complicated, and the assembling work time from being prolonged at the time of manufacturing the ozone gas generator. In a case where the first electrode portion 11 and the second electrode portion 12 are configured such that the accuracy of the discharge gap D1 in 90% or more of the discharging effective area is ±3% or more and ±50% or less, it is possible to further effectively prevent the generation efficiency of the ozone gas from being lowered, while it is possible to prevent the work from being complicated, and the assembling work time from being prolonged at the time of manufacturing the ozone gas generator.

Moreover, in the present embodiment, as described above, the first electrode portion 11 and the second electrode portion 12 of each of the plurality of discharge cells 10 are configured such that the accuracy of the discharge gap D1 is ±3% or more and ±50% or less. Here, if the accuracy of the discharge gap is tightly pursued, it is difficult to manufacture one discharge cell 10 in itself. In the ozone gas generator 100 in which the plurality of discharge cells 10 are provided, particularly, in the ozone gas generator 100 in which the plurality of discharge cells 10 are provided to be integrated in a predetermined volume, since there is a need to assemble the plurality of discharge cells 10 by further integrate the plurality of discharge cells 10 after manufacturing the plurality of discharge cells 10 of which the manufacturing is difficult in itself, it is very difficult to manufacture the ozone gas generator 100. This is particularly noticeable in the ozone gas generator 100 of which the discharge gap is small. On the other hand, the present embodiment, there is no need to tightly pursue the accuracy, by managing the accuracy of each discharge gap D1 of the plurality of discharge cells 10 to be ±3% or more and ±50% or less. Thereby, it is possible to easily manufacture the ozone gas generator 100 including the plurality of discharge cells 10.

In the present embodiment, as described above, the first electrode portion 11 and the second electrode portion 12 of each of the plurality of discharge cells 10 are configured such that the accuracy of the discharge gap D1 is ±3% or more and ±50% or less, with respect to the predetermined reference interval Da. Thereby, since it is possible to manage the discharge gaps D1 of the plurality of discharge cells 10 to be ±3% or more and ±50% or less, respectively, with respect to the common reference interval Da, it is possible to prevent the variation in the discharge gap between the plurality of discharge cells 10. Thereby, since it is possible to prevent the variation in the generation efficiency of the ozone gas which is generated between the plurality of discharge cells 10, it is possible to stably generate the ozone gas as a whole of the device, even in the ozone gas generator 100 including the plurality of discharge cells 10.

In the present embodiment, as described above the first electrode portion 11 and the second electrode portion 12 are configured such that the accuracy of the interval to the average of the discharge gaps D1 in the discharging effective area is ±3% or more and ±50% or less. Thereby, since it is possible to prevent the variation from the average of the discharge gap D1, it is possible to stably generate the ozone gas.

In addition, in the present embodiment, as described above, in a case where the first electrode portion 11 and the second electrode portion 12 are configured such that the accuracy (error) of the discharge gap D1 is ±10% or more, since it is possible to make the accuracy of the discharge gap more loose than ever, it is possible to more easily manufacture the ozone gas generator 100. In a case where the first electrode portion 11 and the second electrode portion 12 are configured such that the accuracy (error) of the discharge gap D1 is ±20% or more, since it is possible to make the accuracy of the discharge gap further loose, it is possible to further easily manufacture the ozone gas generator 100.

In the present embodiment, as described above, in a case where the first electrode portion 11 and the second electrode portion 12 are configured such that the accuracy (error) of the discharge gap D1 is ±40% or less, since it is possible to prevent the variation in the discharge gap more than ever, it is possible to more stably generate the ozone gas. In a case where the first electrode portion 11 and the second electrode portion 12 are configured such that the accuracy (error) of the discharge gap D1 is ±30% or less, since it is possible to further prevent the variation in the discharge gap, it is possible to further stably generate the ozone gas.

As described above, in a case where the first electrode portion 11 and the second electrode portion 12 are configured such that the reference interval Da of the discharge gap D1 is 300 µm or less, in the present embodiment, since there is no need to tightly pursue the accuracy of the discharge gap, it is possible to easily manufacture the ozone gas generator 100 of which the reference interval Da is 300 μm or less, and the discharge gap D1 is small. Furthermore, since the reference interval Da of the ozone gas generator 100 is as small as 300 μm, it is possible to generate the high concentration ozone gas. In a case where the first electrode portion 11 and the second electrode portion 12 are configured such that the reference interval Da of the discharge gap D1 is 200 μm or less, in the present embodiment, since there is no need to tightly pursue the accuracy of the discharge gap, it is possible to easily manufacture even the ozone gas generator 100 of which the reference interval Da is 200 μm or less, and the discharge gap D1 is small more than ever. Furthermore, since the reference interval Da of the ozone gas generator 100 is as small as 200 μm more than ever, it is possible to generate the high concentration ozone gas more than ever. In a case where the first electrode portion 11 and the second electrode portion 12 are configured such that the reference interval Da of the discharge gap D1 is 100 μm or less, in the present embodiment, since there is no need to tightly pursue the accuracy of the discharge gap, it is possible to easily manufacture even the ozone gas generator 100 of which the reference interval Da is 100 μm or less, and the discharge gap D1 is further small. Furthermore, since the reference interval Da of the ozone gas generator 100 is further as further small as 100 μm, it is possible to further generate the high concentration ozone gas.

In the present embodiment, as described above, the metal compound which is included in the functional films 113 and 123 includes at least one element of titanium, niobium, and tungsten. Thereby, even in a case where the high purity oxygen gas which is in a nitrogenless state is used as a raw material gas, it is possible to stably generate the ozone gas, by a catalytic effect of the material including at least one metal of titanium, niobium, and tungsten.

(Description of Example)

Figure 5:
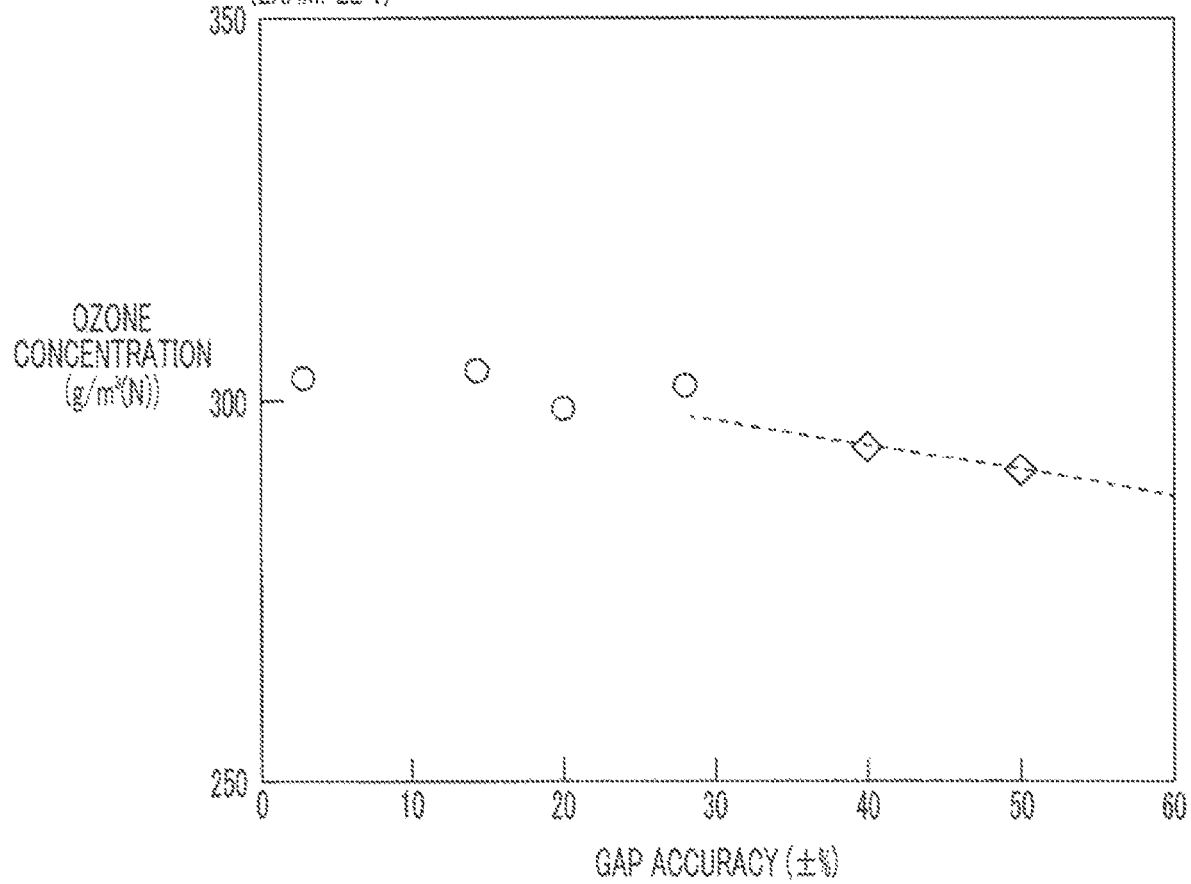
FIG. 5 is a graph illustrating a relationship between gap accuracy and an ozone concentration according to Example 1.

Next, a test result obtained by performing evaluation of the ozone gas generator 100 according to the present embodiment will be described, with reference to FIG. 5 and FIG. 6.

First, a relationship between the gap accuracy and the ozone concentration will be described with reference to FIG. 5. In Example 1 illustrated in FIG. 5, a test was performed by changing the accuracy of the interval (discharge gap) D1 between the surfaces facing each other in the first electrode portion 11 and the second electrode portion 12 of the ozone gas generator 100. The test was performed using the plurality of discharge cells 10 and the same number of discharge cells 10 for each accuracy. The test was performed by supplying the oxygen gas (raw material gas) of the same flow rate for each accuracy. The test was performed by supplying the alternating current power of the same power for each accuracy. In other words, all the conditions other than the gap accuracy were unified. In a case where the gap accuracy was approximately ±3%, approximately ±15%, or approximately ±20%, the reference interval Da of the discharge gap was 70 μm. In a case where the gap accuracy was approximately ±30%, the reference interval Da of the discharge gap was 50 μm. The ozone concentrations in a case where the gap accuracy was approximately ±40% or approximately ±50% was a value predicted based on the results of approximately ±3%, approximately ±15%, approximately ±20%, and approximately ±30%.

In a case where the gap accuracy of the discharge gap was approximately ±3%, approximately ±15%, approximately ±20%, or approximately ±30%, the ozone concentration was approximately 300 g/m$^3$ in a standard state. Considering a measurement error or the like, it can be said that the ozone concentration is not substantially changed substantially in the gap accuracy of approximately ±3%, approximately ±15%, approximately ±20%, or approximately ±30%. In a case where the gap accuracy of the discharge gap is approximately ±40%, it is considered that the ozone concentration is slightly lowered. In a case where the gap accuracy of the discharge gap is approximately ±50%, it is considered that even if the ozone concentration is further lowered, it is within the scope of being capable of stably generating the ozone gas. From the results, it is found out that it is possible to stably generate the ozone gas as long as the gap accuracy of the discharge gap is approximately ±50% or less.

Next, a relationship between the number of discharge cells and the ozone concentration will be described with reference to FIG. 6. In Example 2 illustrated in FIG. 6, a test was performed by changing the number of discharge cells 10. The test was performed by making the flow rates of the oxygen gas (raw material gas) which were supplied to one discharge cell 10 the same flow rate. That is, in a case where the number of discharge cells was N, the test was performed by supplying the oxygen gas of N times in a case where the number of discharge cells was 1. The test was performed by making the powers of the alternating current powers which were supplied to one discharge cell 10 the same. In other words, in a case where the number of discharge cells was N, the test was performed by supplying the power of N times in a case where the number of discharge cells was 1. The test was performed in a case where the accuracy of the discharge gap D1 was set to be approximately ±30%. That is, the conditions other than the number of discharge cells 10 were unified.

Figure 6:
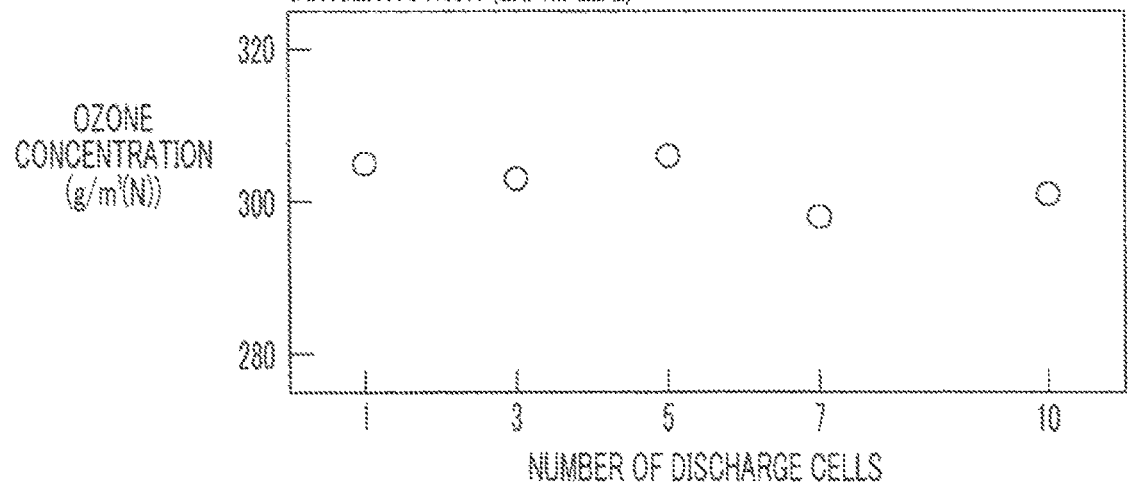
FIG. 6 is a graph illustrating a relationship between the number of discharge cells and an ozone concentration according to Example 2.

As illustrated in FIG. 6, in a case where the number of the discharge cells 10 was 1, 3, 5, 7, or 10, the ozone concentration was approximately 300 g/m$^3$ in the standard state. Considering the measurement error or the like, it can be said that the ozone concentration is not substantially changed in a case where the number of discharge cells 10 is 1, 3, 5, 7, or 10. In other words, it is found out that it is possible to stably generate the ozone gas even in a case where there is the variation of approximately ±30% in the discharge gap between the discharge cells 10.

(Modification Example)

It is considered that the embodiments and examples disclosed this time are an example in all points, and are not limited. The scope of the present invention is described by the scope of the claims rather, but not the description of the embodiments and examples described above, and further includes the meaning which is equivalent to the scope of the claims, and all changes (modification examples) within the scope.

For example, in the embodiments described above, an example of the configuration in which the functional films as a layer including at least one of the metal or the metal compound are provided in both of the first electrode portion and the second electrode portion is described, but the present invention is limited thereto. In the present invention, the layer including at least one of the metal or the metal compound may be provided on at least one side of the first electrode portion and the second electrode portion.

In the embodiments described above, an example of the configuration in which the dielectrics are provided on both of the first electrode portion and the second electrode portion is described, but the present invention is not limited thereto. In the present invention, the dielectric may be provided on at least one side of the first electrode portion and the second electrode portion.

In the embodiments described above, an example of the configuration in which the functional film as a layer including at least one of the metal or the metal compound is provided on the surface of the dielectric is described, but the present invention is not limited thereto. In the present invention, the layer including at least one of the metal or the metal compound may be provided on the surface of the first electrode or the second electrode. For example, the dielectric may be provided on the surface of the first electrode, and the layer including at least one of the metal or the metal compound may be provided on the surface of the second electrode.

Moreover, in the embodiments described above, an example of the configuration in which the functional film as a layer including at least one of the metal or the metal compound is provided on substantially the entire surface of the surfaces facing each other in the first electrode portion and the second electrode portion is described, but the present invention is not limited thereto. In the present invention, the layer including at least one of the metal or the metal compound may be provided in at least a portion of at least one of the first electrode portion and the second electrode portion. The layer including at least one of the metal or the metal compound may be provided in a line shape or a dot shape, in addition to a surface shape.

In the embodiments described above, an example of the configuration in which the material of the functional film as a layer including at least one of the metal or the metal compound is applied on the dielectric by the screen printing to form the functional film is described, but the present invention is not limited thereto. In the present invention, the layer including at least one of the metal or the metal compound may be formed on the dielectric by sputtering. The material of the layer including at least one of the metal or the metal compound is applied on the dielectric by other methods in addition to the screen printing, thereby, the layer including at least one of the metal or the metal compound may be formed. The layer including at least one of the metal or the metal compound may be formed by a plate-shaped member.

In the embodiments described above, an example in which the dielectric is formed of alumina is described, but the present invention is not limited thereto. In the present invention, the dielectric may be formed of ceramic other than alumina, or may be formed of a material other than ceramic. For example, the dielectric may be formed of glass.

In the embodiments described above, an example of the configuration in which the rib is formed by applying or printing the material of the rib on the dielectric is described, but the present invention is not limited thereto. In the present invention, the rib may be formed by stacking the materials of the rib on the dielectric with a 3D printer or the like.

Furthermore, in the embodiments described above, an example in which the present invention is applied to the plate-shaped ozone gas generator is described, but the present invention is not limited thereto. The present invention may be applied to a tube-shaped ozone gas generator. In this case, a plurality of tube-shaped discharge cells may be provided in the tube-shaped ozone gas generator. The plurality of tube-shaped discharge cells may be integrated. For example, the plurality of tube-shaped discharge cells may be integrated by being arrayed to be extended in parallel along a longitudinal direction of a housing in the cylinder-shaped housing.

In the embodiments described above, an example in which the present invention is applied to the ozone gas generator of a so-called nitrogenless type in which the nitrogen is not added to the raw material gas is described, but the present invention is not limited thereto. For example, the present invention may be applied to the ozone gas generator of a type in which the high concentration nitrogen is included in the raw material gas.

In the embodiments described above, an example of the configuration in which the reference interval of the interval between the surfaces facing each other in the first electrode portion and the second electrode portion is 300 μm or less is described, but the present invention is not limited thereto. In the present invention, the reference interval of the interval between the surfaces facing each other in the first electrode portion and the second electrode portion may be 300 μm or more.

In the embodiments described above, an example of the configuration in which the surfaces facing each other in the first electrode portion and the second electrode portion are formed into the flat shape is described, but the present invention is not limited thereto. In the present invention, an uneven shape may be formed on at least one of the surfaces facing each other in the first electrode portion and the second electrode portion.

In the embodiments described above, an example of the configuration in which the plurality of discharge cells are provided in the ozone gas generator is described, but the present invention is not limited thereto. In the present invention, one discharge cell may be provided in the ozone gas generator.

For example, the ozone gas generator of the present invention may be used by being incorporated into a device such as an ozone water manufacturing device.

DESCRIPTION OF REFERENCE NUMERALS

10: discharge cell
11: first electrode portion
12: second electrode portion
100: ozone gas generator
111: first electrode
112: dielectric
113: functional film (layer including at least one of a metal or a metal compound)
121: second electrode
122: dielectric
123: functional film (layer including at least one of a metal or a metal compound)

The invention claimed is:

1. A method for manufacturing an ozone gas generator, comprising:
a step of forming a first electrode portion that includes a first electrode;
a step of forming a second electrode portion that includes a second electrode; and
a step of disposing the first electrode portion and the second electrode portion in which the first electrode portion and the second electrode portion face each other with an intended discharge gap Da of 300 μm or less,
a step of providing a dielectric on a surface of the first electrode or the second electrode on sides facing each other in the first electrode portion and the second electrode portion,
a step of forming a member having a height D2 on the dielectric between the first electrode portion and the second electrode portion,
a step of providing a layer having a thickness D3 that includes at least one of a metal or a metal compound on at least a portion of the surface of the first electrode or the second electrode on the sides facing each other, or the dielectric in the first electrode portion and the second electrode portion, wherein the member is formed and the layer is provided such that the height D2 and the thickness D3 cause an actual discharge gap D1 between the first electrode portion and the second electrode portion to vary by x % from the intended discharge gap Da, wherein, $10 \leq x \leq 50$, and $(1-x/100) \times Da \leq D1 \leq (1+x/100) \times Da$.

2. The method of claim 1, wherein
the varying of the actual discharge gap D1 between the surfaces facing each other is due to at least one of:
a first variation in a height of the member; or
a second variation in a thickness of the layer.

3. The method according to claim 1, wherein
the first electrode portion and the second electrode portion are configured such that the accuracy of the intended discharge gap D1 between the surfaces facing each other in 30% or more of a discharging effective area is x %.

4. The method according to claim 1, wherein
a plurality of discharge cells, each of which is formed of the first electrode portion and the second electrode portion are provided, and
the first electrode portion and the second electrode portion of each of the plurality of discharge cells are configured such that the accuracy of the actual discharge gap D1 between the surfaces facing each other is x %.

5. The method according to claim 1, wherein
the first electrode portion and the second electrode portion of each of the plurality of discharge cells are configured such that the accuracy of the actual discharge gap D1 between the surfaces facing each other is x %, with respect to the intended discharge gap Da.

6. The method according to claim 1, wherein
the first electrode portion and the second electrode portion are configured such that the accuracy of the actual discharge gap D1 to an average of the discharge gaps between the surfaces facing each other in the discharging effective area is x %.

7. The method according to claim 1, wherein
the first electrode portion and the second electrode portion are configured such that the accuracy of the actual discharge gap D1 between the surfaces facing each other is x %, with respect to the intended discharge gap Da of 300 μm or less.

8. The method according to claim 1, wherein
the first electrode portion and the second electrode portion are configured such that the accuracy of the actual discharge gap D1 between the surfaces facing each other is y % with respect to the intended discharge gap Da of 300 μm or less, wherein, $10 \leq y \leq 30$, and $(1-y/100) \times Da \leq D1 \leq (1+y/100) \times Da$.

9. The method according to claim 1, wherein
the layer that includes at least one of the metal or the metal compound is a layer including a metal compound, and
the metal compound includes at least one metal of titanium, niobium, and tungsten.

10. The method according to claim 1, wherein
the member is formed such that the height D2 is approximately one half of the intended discharge gap Da.

* * * * *